United States Patent
Govindhakannan et al.

(10) Patent No.: US 10,041,004 B2
(45) Date of Patent: Aug. 7, 2018

(54) PROCESSES FOR PRODUCING DEASHED PITCH

(71) Applicant: UOP LLC, Des Plaines, IL (US)

(72) Inventors: Jagannathan Govindhakannan, Des Plaines, IL (US); Grant H. Yokomizo, Mount Prospect, IL (US); Robert Haizmann, Rolling Meadows, IL (US); Hans G. Lefebvre, Chicago, IL (US); Trung Pham, Mount Prospect, IL (US); Andrew J. Towarnicky, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 168 days.

(21) Appl. No.: 14/534,729

(22) Filed: Nov. 6, 2014

(65) Prior Publication Data

US 2016/0130506 A1    May 12, 2016

(51) Int. Cl.
*C10G 67/04* (2006.01)
*C10C 3/08* (2006.01)
*C08L 95/00* (2006.01)
*C10G 47/26* (2006.01)

(52) U.S. Cl.
CPC ............. *C10C 3/08* (2013.01); *C08L 95/00* (2013.01); *C10G 47/26* (2013.01); *C10G 67/04* (2013.01)

(58) Field of Classification Search
CPC .............................. C10C 3/08; C10G 67/0445
See application file for complete search history.

(56) References Cited

U.S. PATENT DOCUMENTS

| | | | |
|---|---|---|---|
| 3,372,045 A | 3/1968 | Baum et al. | |
| 4,241,196 A | 12/1980 | Chattha | |
| 4,431,520 A * | 2/1984 | Giuliani | C10G 49/12 208/108 |
| 4,502,943 A * | 3/1985 | Dickakian | C10C 3/002 208/22 |
| 6,267,809 B1 | 7/2001 | Boyer et al. | |
| 6,352,637 B1 | 3/2002 | Doolin et al. | |
| 6,361,591 B1 * | 3/2002 | Boyer | C08L 95/00 106/277 |
| 9,127,216 B2 * | 9/2015 | Govindhakannan | C10G 31/10 |
| 2002/0011427 A1 * | 1/2002 | Romine | C10C 3/00 208/45 |

(Continued)

FOREIGN PATENT DOCUMENTS

| JP | 2012007063 A2 | 1/2012 |
|---|---|---|
| WO | 2011163300 A2 | 12/2011 |

OTHER PUBLICATIONS

Ashland, Material Safety Data Sheet, HI SOL 15, published Nov. 8, 2002, accessed on Jun. 10, 2016 <http://www.sfm.state.or.us/cr2k_subdb/MSDS/SOLVENT_1X.PDF>.*

(Continued)

*Primary Examiner* — Michelle Stein

(57) ABSTRACT

A process for de-ashing pitch. The pitch from a slurry hydrocracking process is mixed with a solvent. The mixture is separated into solvent and soluble materials and insoluble materials. The insoluble materials can be dried to recover solvent which may be recycled. The solvent and soluble materials are separated. The solvent may be recovered and recycled. Hi-Sol 15 may be the solvent. Additionally, CSO may be the solvent and a portion thereof may be used with the de-ashed pitch to make an asphalt binder.

18 Claims, 3 Drawing Sheets

(56) References Cited

U.S. PATENT DOCUMENTS

2011/0303580 A1* 12/2011 Haizmann .............. C10G 47/26
208/40

OTHER PUBLICATIONS

Yan, Tsoung-yuan, "Manufacture of Road-Paving Asphalt Using Coal Tar," Industrial and Engineering Chemistry Product Research & Development (1986), 25(4), 637-640.
Search Report dated Apr. 14, 2016 for corresponding PCT International Application No. PCT/US2015/058922.

* cited by examiner

PROCESSES FOR PRODUCING DEASHED PITCH

FIELD OF THE INVENTION

This invention relates generally to a process for producing de-ashed pitch, and more particularly to a process for producing an asphalt binder from a deashed pitch.

BACKGROUND OF THE INVENTION

Petroleum refining and petrochemical processes frequently involve slurry hydrocracking. The slurry hydrocracking process produces a pitch fraction that boils above 524° C. and contains organic and inorganic solids. Pitch disposal may be a problem for the refiner if suitable outlets are not available. For example, a typical 40,000 barrel/day slurry hydrocracking unit produces 200,000 tons/year of pitch. As will be appreciated, if a suitable disposal option is not available, the amount of pitched produced by the unit will quickly accumulate.

If the solids are removed from the pitch fraction, the resulting deashed hydrocarbon material can be used for several value-added applications that may include but not limited to fuel oil blending, asphalt manufacturing, and binders for the production of anodes, electrodes, and metallurgical coke. The concentrated solids also become more amenable to further processing, such as combustion, metals reclamation, landfill disposal, and transport to cement plants and other outlets.

One process for separating the pitch fraction into solids and hydrocarbons is a deashing process. Additionally, as mentioned above, one potential application for the deashed pitch is its use as a blending component for the production of asphalt binder for road paving applications. However, deashed pitch is a very stiff and brittle material with zero penetration and very low ductility. Penetration and ductility are two of the key specifications for Viscosity-Graded (VG) asphalt binders for use in pavement construction as detailed in ASTM D3381/D3381M-13. To make acceptable asphalt binders, deashed pitch needs to be blended with a suitable and easily accessible material preferably hydrocarbon with flash points greater than 220° C.

Therefore, it would be desirable to provide a process that produces deashed pitch, and even more desirable to have a process that produces an asphalt binder from the deashed pitch.

SUMMARY OF THE INVENTION

One or more processes have been invented for producing deashed pitch, which can be used for making, for example, an asphalt binder.

In a first aspect of the present invention, the invention may be characterized as a process for producing a deashed pitch. The process generally comprises mixing a pitch from a slurry hydrocracking zone with a solvent. The pitch includes heavy hydrocarbons ($C_{20}$+ hydrocarbons), coke, and catalyst. At least a portion of the pitch is soluble in the solvent. The process also includes separating the solvent and soluble portion of the pitch from an insoluble portion of the pitch and removing the soluble portion of the pitch from the solvent. The soluble portion of the pitch removed from the solvent comprises a de-ashed pitch.

In at least one embodiment, the soluble portion of the pitch and the solvent are separated from the insoluble portion of the pitch by a centrifuge. It is contemplated that the process further includes recovering the solvent after the soluble portion of the pitch has been removed from the solvent, and mixing the recovered solvent with fresh pitch from the slurry hydrocracking process.

In some embodiments of the present invention, the process further comprises drying the insoluble portion of the pitch separated from the soluble portion of the pitch and the solvent to form a dried solids stream, and recovering a residual solvent during the drying. It is contemplated that the dried solids comprises at least one of coke and catalyst particles. The process may further include mixing the residual solvent with fresh pitch from the slurry hydrocracking process.

In one or more embodiments of the present invention, the solvent comprises an aromatic solvent. It is contemplated that the solvent comprises Hi-Sol 15.

In one or more embodiments of the present invention, the process further comprises mixing the deashed pitch with a heavy cut of a clarified slurry oil (CSO) to form an asphalt binder. It is contemplated that the solvent comprises a portion of the clarified slurry oil.

In another aspect of the present invention, the invention provides a process for producing an asphalt binder which comprises mixing a pitch from a slurry hydrocracking zone with a solvent in a mixing zone. The pitch includes heavy hydrocarbons, coke, and catalyst. At least a portion of the pitch is soluble in the solvent. The process includes separating the solvent and soluble portion of the pitch from an insoluble portion of the pitch in a separation zone, mixing clarified slurry oil with the solvent and soluble portion of the pitch to form a combined stream, separating a first portion of the clarified slurry oil from the soluble portion of the pitch and a second portion of the clarified slurry oil in a solvent recovery zone, and, passing the first portion of the clarified slurry oil from the solvent recovery zone to the mixing zone as the solvent.

In at least one embodiment of the present invention, the mixture of the soluble portion of the pitch and the second portion of the clarified slurry oil comprises an asphalt binder. It is contemplated that the asphalt binder comprises approximately 30% to 50% by weight of a heavy cut of CSO.

In some embodiments of the present invention, the process further comprises drying the insoluble portion of the pitch separated from the soluble portion of the pitch and the solvent to form a dried solids, and, recovering a residual solvent during the drying. The dried solids may comprise at least one of coke and catalyst. It is contemplated that the residual solvent is mixed with fresh pitch from a thermal hydrocracking process.

In yet another aspect of the present invention, the invention provides a process for producing an asphalt binder by mixing a pitch from a slurry hydrocracking zone with a solvent in a mixing zone, at least a portion of the pitch being soluble in the solvent, separating the solvent and soluble portion of the pitch from an insoluble portion of the pitch in a separation zone, removing the soluble portion of the pitch from the solvent in a solvent recovery zone, mixing the solvent removed from the soluble portion of the pitch from the solvent recovery zone in the mixing zone with fresh pitch, drying the insoluble portion of the pitch separated from the soluble portion of the pitch and the solvent to form a dried solids, recovering a residual solvent during the drying, and, mixing the residual solvent with fresh pitch in the mixing zone.

In some embodiments of the present invention, the solvent is an aromatic solvent selected from the group consisting of: light cycle oil; Hi-Sol 15; heavy reformate; toluene; benzene; furfural; heavy naphtha; and, light clarified slurry oil.

In some embodiments of the present invention, the solvent has a boiling point range of between approximately 180° C. and 200° C.

In some embodiments of the present invention, the solvent has a boiling point range with a high end that is lower than an initial boiling point of the pitch and a low end that is higher than a maximum operating temperature of the separation zone.

Additional objects, embodiments, and details of the invention are set forth in the following detailed description of the invention.

DETAILED DESCRIPTION OF THE DRAWINGS

The drawings are exemplary of various aspects and embodiments of the present invention in which.

DETAILED DESCRIPTION OF THE INVENTION

One or more processes have been developed for de-ashing pitch. The pitch fraction from the a slurry hydrocracking unit may comprise between 10 to 30 wt % solids and have a viscosity at least 2 to 3 orders of magnitude higher than that of the typical vacuum residues. This various embodiments of the present invention dilute the pitch using a solvent to solubilize as much of the hydrocarbons in the pitch as possible, thereby reducing the viscosity of the resulting mixture to less than 0.001 to 0.050 Pa·s (1 to 50 cP). Thereafter, the solids may be separated using one or more stages of mechanical separation based on enhanced particle separation from solution, such as a continuous decanter centrifuge. This separation step provides two main products: a stream of pitch liquid (or a soluble portion) mixed with solvent; and a stream containing the vast majority of the pitch solids (or an insoluble portion) which also includes some remaining solvent and liquid pitch that adheres to the solids.

The solvent present in solution with the deashed pitch can be removed by distillation to produce a hydrocarbon stream with substantially less ash content, generally <1%, that can be used in asphalt, anode, and metallurgical coke applications.

The solvent remaining with the solids can be removed by one or more stages of drying operations. Preferentially, this is accomplished in a paddle dryer. A paddle dryer uses powerful mechanical agitation to dry the material through high viscosity phases. The solids are recovered as a dry product, and the solvent is evaporated and recovered in downstream equipment. The solvent streams that are recovered via distillation and drying are recycled.

With reference to the attached Figures, various exemplary processes will now be described with the understanding that the processes are merely exemplary and are not intended to be limiting.

Figure 1:
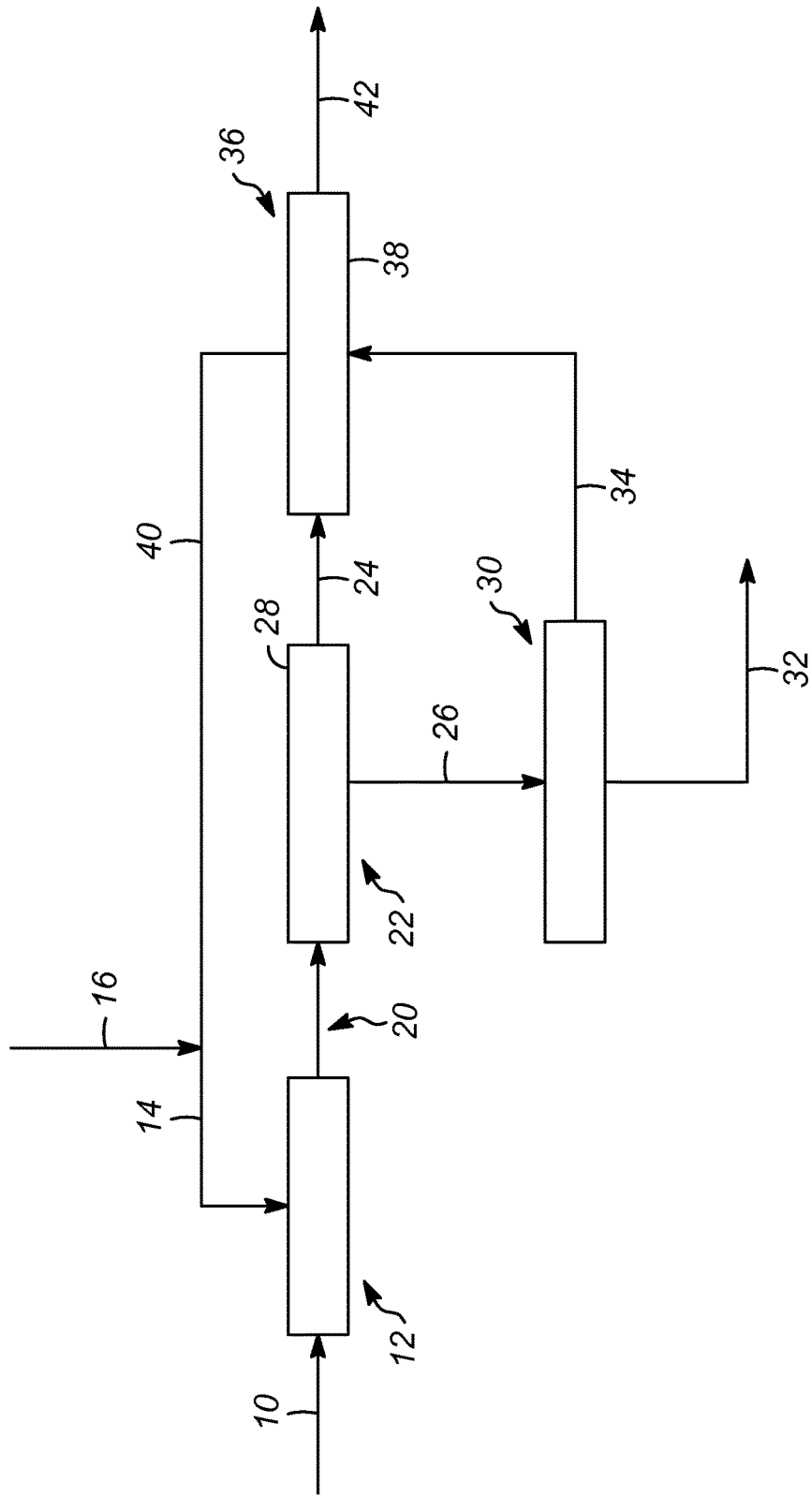
FIG. 1 shows a simplified process diagram according to one or more embodiments of the present invention.

In FIG. 1, a feed stream 10 comprises a bottoms stream from a vacuum column processing an effluent from a slurry hydrocracking reactor. The vacuum column and slurry hydrocracking reactor are known for example, a slurry hydrocracking process is disclosed in U.S. Pat. No. 8,691,080 and U.S. Pat. Pub. No. 2014/0102944, both of which are incorporated herein by reference. Generally, in a slurry hydrocracking process, a feed stock is mixed with catalyst to form a slurry. The slurry may be combined with a gas, such as hydrogen, and passed to a heater. Once the gas and slurry mixture has been heated, it can be passed to a reaction zone. Conditions in the reaction zone can include a temperature of about 340 to about 600° C., a hydrogen partial pressure of about 3.5 to about 35 MPa, preferably 13.0 to 27 MPa, and an LHSV typically below about 4 $h^{-1}$ on a fresh feed basis, with a range of about 0.05 to about 3 $hr^{-1}$ being preferred and a range of about 0.2 to about 1 $hr^{-1}$ being particularly preferred.

The reactor conditions are sufficient to convert at least a portion of the hydrocarbon feed to lower boiling products, such as one or more $C_1$ to $C_4$ products, naphtha, kerosene, diesel, other distillates or combinations thereof. The desirable products can be recovered via a distillation, such as a vacuum distillation. However, a portion of the reaction product, namely pitch, will remain after vacuum distillation. Typically, pitch has a boiling point greater than about 500° C. This high boiling material can have a very low commercial value due to high viscosity, portability difficulties, and high levels of undesired components, such as sulfur contaminants and a slurry hydrocracking catalyst used during the cracking of the feedstock. Exemplary catalyst compounds can include a catalytically effective amount of one or more compounds having iron. Particularly, the one or more compounds can include at least one of an iron oxide, an iron sulfate, and an iron carbonate. Other forms of iron can include at least one of an iron sulfide, a pyrrhotite, a bauxite and a pyrite. The catalyst can also contain materials other than an iron, such as at least one of molybdenum, nickel, and manganese, and/or a salt, an oxide, and/or a mineral thereof.

Returning to FIG. 1, pitch comprises a mixture of coke, heavy hydrocarbons, and catalyst and forms the feed stream 10 passed to a mixing zone 12. The pitch can be stored and used later, or stored and shipped to another location, or it may be directly passed to the mixing zone 12. The timing and method of obtaining the pitch and passing the pitch to the mixing zone 12 are not necessarily important for an understanding or practicing of the present invention.

In the mixing zone 12, the pitch is mixed with a solvent 14, preferably an aromatic solvent, such as light cycle oil, Hi-Sol 15, heavy reformate, toluene, benzene, furfural, aromatic gasoline, and, clarified slurry oil and mixtures thereof. As will be discussed below, the solvent 14 may be recovered from downstream processing and recycled back to the mixing zone 12. At certain times, make up or fresh solvent 16 may be added (for example at the start of the process). A portion of the thermally hydrocracked pitch, mostly the heavy hydrocarbons, will be soluble in the solvent 14, while a second portion, the remaining components, will not be soluble in the solvent 14.

Accordingly, the mixture 20 of thermally hydrocracked pitch and solvent 14 can be passed to a separation zone 22 to separate the mixture 20 into a liquid phase 24 and a solids phase 26. In a preferred embodiment, the separation zone 22 comprises a centrifuge 28, and in a most preferred embodiment, the centrifuge 28 is a decanter centrifuge. In other embodiments, the separation zone 22 comprises a vertical centrifuge separator, a mixer-settler, a filtration system, a liquid-liquid extractor, a hydrocyclone, or other such equipment. If a decanter centrifuge is used, the process can be advantageously continuous in which the mixture 20 of pitch and solvent is continuously passed to the separation zone 22 and the liquid phase 24 and the solids phase 26 continuously can be recovered therefrom. Typically, the decanter centrifuge includes a heater for heating the mixture 20 of thermally hydrocracked pitch and solvent. The maximum operating temperature of the separation zone 22, and more particularly the centrifuge 28, is between 100 to 165° C. As will be discussed below, this maximum operating temperature can be used to select the solvent 14 used in one or more processes of the present application.

The liquid phase 24 comprises the solvent and the soluble portions of the thermally hydrocracked pitch. The solids phase 26 comprises the insoluble portions of the thermally hydrocracked pitch, as well as some small amount of solvent. The solids phase 26 may be passed to a drying zone 30 to produce dried solids 32. The dried solids 32 will include at least one of coke, spent catalyst, and the other impurities from the pitch. A preferred drying zone 30 comprises a paddle dryer which is heated by a hot oil system through the shell. The paddles are also heated. The motion of paddles will move the solids phase and break up the solids phase into clumps for faster drying. A residual solvent 34 may also be recovered from the drying zone 30. The dried solids 32 can be used as a fuel in a cement kiln. It is contemplated that the drying can also be accomplished with a kneader-mixer, an extruder, a drum dryer, rotary dryer, or other substantially similar equipment.

Returning to the separation zone 22, the liquid phase 24 may be passed to a recovery zone 36 to separate the solvent from the remaining portions of the thermally hydrocracked pitch. A vacuum distillation column 38 may be used to separate the solvent and the remaining portions of the thermally hydrocracked pitch in the recovery zone 36. Other separation methods, processes or equipment may also be used. The recovery zone 36 may also receive the residual solvent 34 from the drying zone 30.

Both the solvent 40 recovered from the recovery zone 36 and residual solvent 34 may be recycled back to the mixing zone 12 where the solvent can be mixed with fresh thermally hydrocracked pitch in feed stream 10.

Returning to the recovery zone 36, the portion of the thermally hydrocracked pitch that is separated from the solvent comprises deashed pitch 42 which mainly comprises the heavy hydrocarbons from the thermally hydrocracked pitch. The deashed pitch 42 can be used in a variety of applications.

With respect to the solvent 14, one exemplary solvent is Hi-Sol 15. Principally, Hi-Sol 15 is a bottoms product from an aromatic complex's heavy aromatics column, and is available commercially from a vendor or can be passed directly to the process from an existing aromatic complex. It is mostly aromatic, comprised chiefly of $C_{10}$ and $C_{11}$ aromatic compounds. This mixture has a lower vapor pressure than heavy reformate, as well as a boiling range below that of light cycle oil, and with either equal or better aromaticity than both heavy reformate and light cycle oil. While the overall process would remain the same as for the various solvents, individual unit operations such as the centrifuge and dryer temperature and pressure may be changed. If the increased aromaticity of Hi-Sol 15 results in better pitch solubility, the solvent to pitch ratio might be lowered, from for example a 5:1 ratio of solvent to pitch (by volume) to a 3:1 ratio, depending on the pitch characteristics, such as structure, composition, and aromaticity. This would result in lower capital expenditures and lower operating expenses. For example, the vacuum column and its heater would be designed for the lighter Hi-Sol 15 (as compared to light cycle oil), which may include reduced fired heater duty, reduced solvent pump around, improved HVGO recovery, reduced solvent loss, and reduced overhead flow.

Hi-Sol 15 has a boiling point range of between approximately 180° C. and 200° C., typically with a high end that is lower than a boiling point of the pitch and a low end that is higher than a maximum operating temperature of the separation zone 22. Therefore, other solvents with the same or similar characteristics are also believed to be useful in the various embodiments of the present invention.

Figure 2:
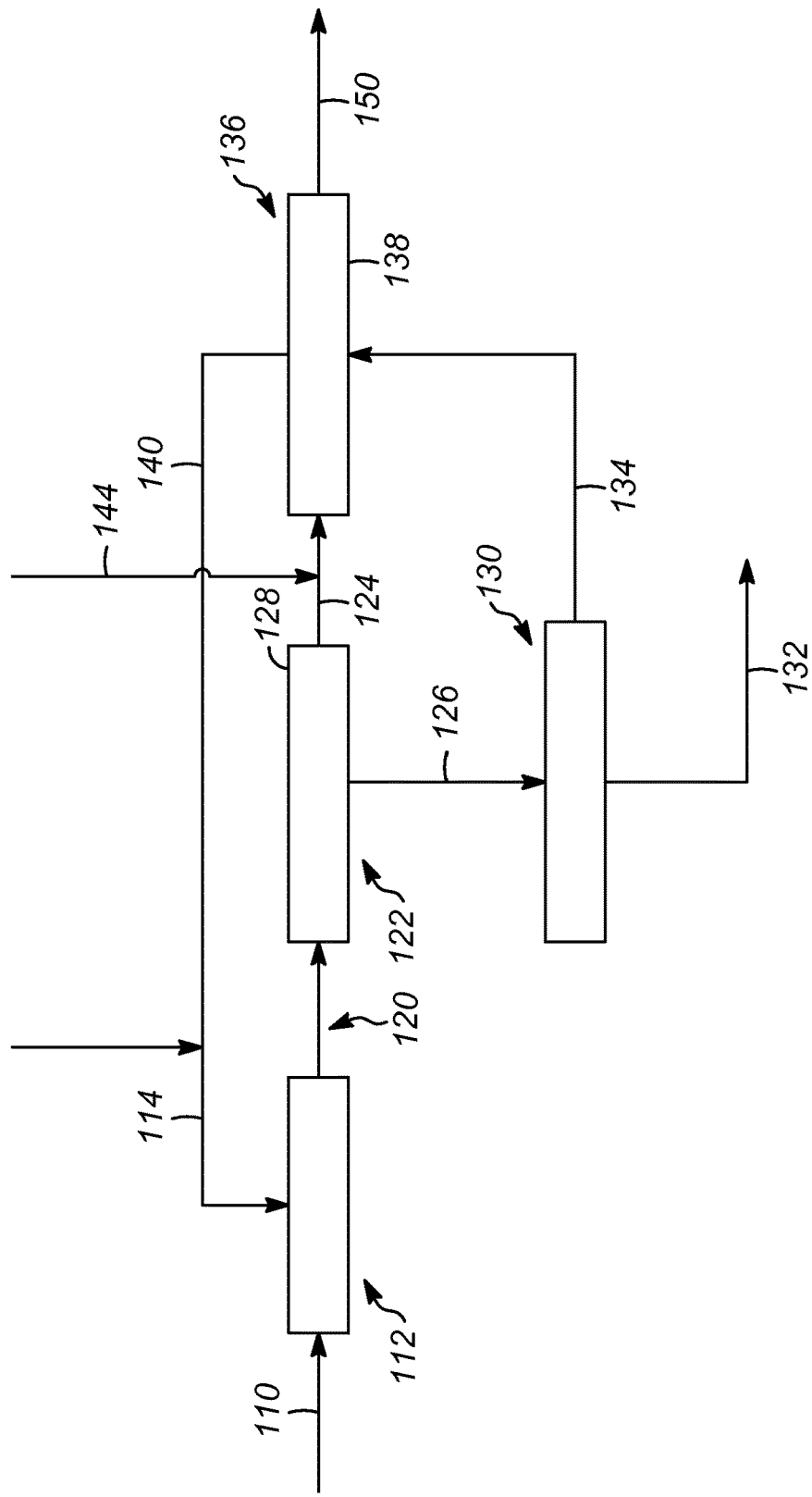
FIG. 2 shows another simplified process diagram according to one or more embodiments of the present invention; and, FIG. 3 shows a graph correlating the amount of heavy clarified slurry oil in pitch relative to a penetration for an asphalt binder made according to one or more embodiments of the present invention.

As shown in FIG. 2, in some embodiments of the present invention, the present invention provides a process for producing asphalt binder from the deashed pitch.

In the embodiment shown in FIG. 2, the process is similar to the one shown in FIG. 1, however, in this embodiment, a clarified slurry oil (CSO) stream 144, such as from an fluid catalyst cracking unit and/or storage, is passed to a vacuum distillation column of a solvent recovery zone 136. The processing upstream of the solvent recovery zone 136, discussed briefly below, may be identical to the embodiment shown in FIG. 1.

Clarified slurry oil is rich in aromatics and therefore may be a solvent for the pitch in the deashing process. There are two different requirements for solvents in a pitch deashing process used to produce asphalt binder. The first requirement arises from the fact is that the pitch is very viscous and needs to reduce its viscosity before being processed in a decanter centrifuge. A suitable solvent for this purpose is required to be rich in aromatics so that pitch solubility is maximized. The second requirement for the solvent in pitch deashing process used to produce asphalt binder arises from the need to improve the penetration and softening point characteristics of the produced asphalt binder. It has been discovered that CSO can meet both of these needs.

A typical CSO has an initial boiling point of approximately 200° C. and a final boiling point greater than 525° C. To be used as an asphalt blending stock, a sufficient amount of the lower boiling point materials in the CSO must be removed so that the blended mixture will meet its flash point specifications. The flash point specification for asphalt binders is typically greater than 220° C. In the preferred embodiment of the present invention, the CSO is separated into two fractions—a light CSO and a heavy CSO with a T5 point of at least 350° C. for the heavy fraction. We predict that T5, if greater than 350° C., will correlate to a flash point greater than 220° C. The light and heavy CSO can be used as the solvent for pitch deashing and the blending stock for asphalt production, respectively.

Returning to FIG. 2, in the vacuum distillation column 138 of the solvent recovery zone 136, the CSO will separate into a light CSO and a heavy CSO. The light CSO can be recycled back as the solvent 140 to the mixing zone 112 to be mixed with pitch in the feed stream 110. As with the embodiment of FIG. 1, any residual solvent 134 from the drying zone 130 may be evaporated and also recycled back to the mixing zone 112, preferably, although not required, through the solvent recovery zone 136. As with the embodiment in FIG. 1, in the mixing zone 112, the pitch and solvent will mix together and the mixture 120 will pass to a separation zone 122, again preferably comprising a centrifuge 128. The solids phase 126 from the separation zone 122 can be dried in the dying zone to form dried solids 132. The liquid phase 124 from the separation zone 122 will be combined with the CSO stream 144 and passed to the recovery zone to separate the light CSO from the heavy CSO and deashed pitch.

The heavy CSO that is separated from the CSO stream 144 is recovered along with the deashed pitch. A side draw in the vacuum distillation column 138 can be used to adjust the flash point specifications of the blend of deashed pitch and heavy CSO. The mixture of deashed pitch and heavy CSO recovered from the solvent recovery zone 136 comprises asphalt binder 150.

Figure 3:
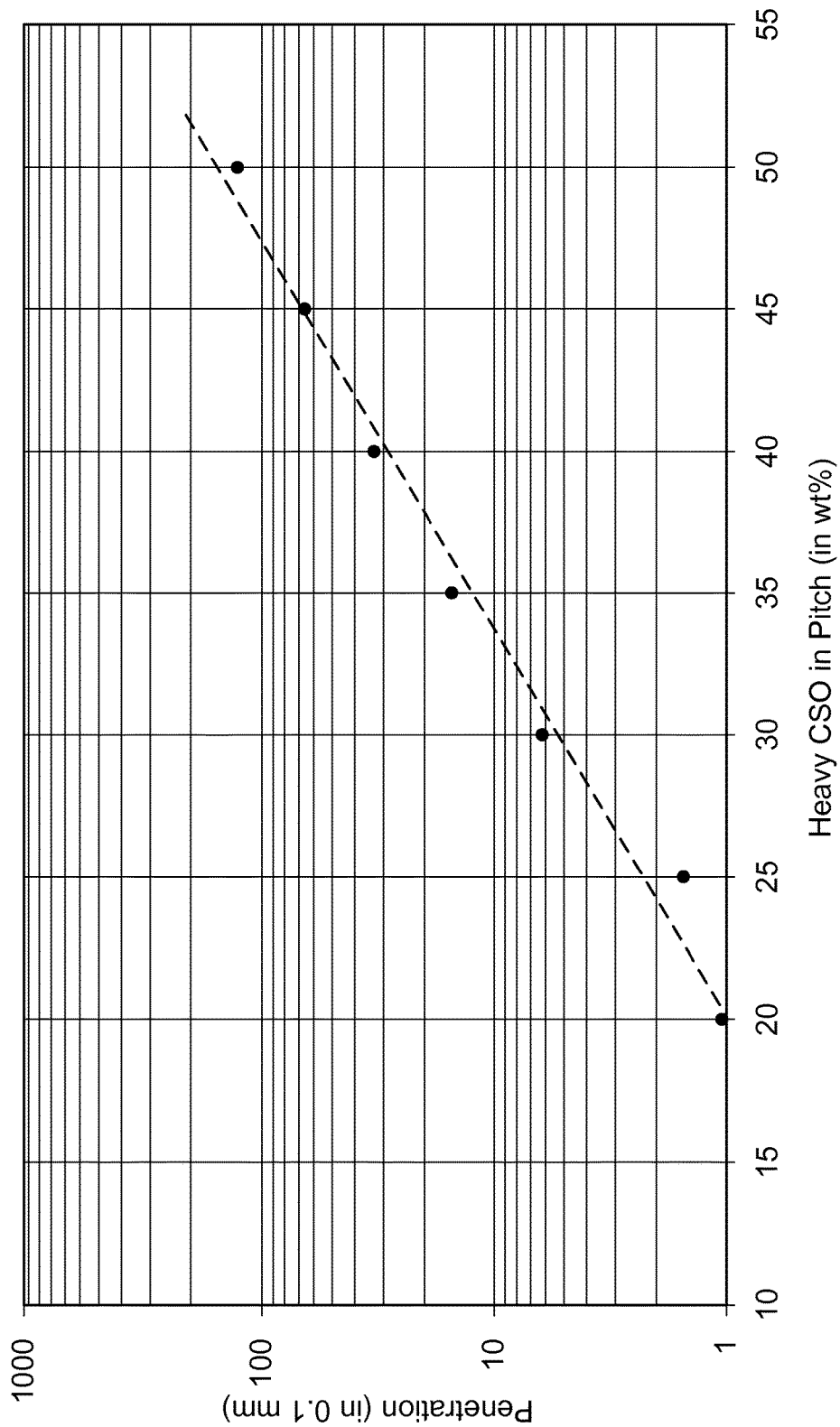

The effect of concentration of heavy CSO on the penetration of the deashed pitch blend is shown in FIG. 3. The weight percent of heavy CSO in deashed pitch can be adjusted to achieve any desired penetration. A preferred asphalt binder penetration of 40-100 can be achieved by blending 40-50 wt % of heavy CSO with deashed pitch.

Therefore, processes according to the present invention have provided a deashed pitch, improved solvent usage for deashing pitch, and an asphalt binder from the deashed pitch.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for producing a deashed pitch, the process comprising:
    mixing a pitch from a slurry hydrocracking zone with a solvent, the pitch including heavy hydrocarbons, coke, and catalyst, and at least a portion of the pitch being soluble in the solvent;
    separating the solvent and a soluble portion of the pitch from an insoluble portion of the pitch;
    removing the soluble portion of the pitch from the solvent in a solvent recovery zone, wherein the soluble portion of the pitch removed from the solvent comprises a deashed pitch;
    drying the insoluble portion of the pitch separated from the soluble portion of the pitch and the solvent to form a dried solids; and
    recovering a residual solvent during the drying, wherein the residual solvent is passed to the solvent recovery zone.

2. The process of claim 1 wherein the soluble portion of the pitch and the solvent are separated from the insoluble portion of the pitch by a centrifuge.

3. The process of claim 2 further comprising:
    recovering the solvent after the soluble portion of the pitch has been removed from the solvent; and,
    mixing the recovered solvent with fresh pitch from a thermal hydrocracking process.

4. The process of claim 1 wherein the dried solids comprises at least one of coke and catalyst.

5. The process of claim 1 further comprising:
    mixing the residual solvent with fresh pitch from a thermal hydrocracking process.

6. The process of claim 1 wherein the solvent comprises an aromatic solvent.

7. The process of claim 6 wherein the solvent comprises Hi-Sol 15.

8. The process of claim 1 further comprising:
    mixing the deashed pitch with a clarified slurry oil to form an asphalt binder.

9. The process of claim 8 wherein the solvent comprises a portion of the clarified slurry oil.

10. A process for producing an asphalt binder, the process comprising:
    mixing a pitch from a slurry hydrocracking zone with a solvent in a mixing zone, the pitch including heavy hydrocarbons, coke, and catalyst, and at least a portion of the pitch being soluble in the solvent;
    separating the solvent and a soluble portion of the pitch from an insoluble portion of the pitch in a separation zone;
    mixing a clarified slurry oil with the solvent and soluble portion of the pitch to form a combined stream;
    separating a light clarified slurry oil from the soluble portion of the pitch and a heavy clarified slurry oil in a solvent recovery zone to obtain a mixture of the soluble portion of the pitch and the heavy clarified slurry oil, wherein the mixture of the soluble portion of the pitch and the heavy clarified slurry oil comprises the asphalt binder; and,
    passing the light clarified slurry oil from the solvent recovery zone to the mixing zone as the solvent.

11. The process of claim 10 wherein the asphalt binder comprises approximately 30% to 50% clarified slurry oil, by weight.

12. The process of claim 10 further comprising:
    drying the insoluble portion of the pitch separated from the soluble portion of the pitch and the solvent to form a dried solids; and,
    recovering a residual solvent during the drying.

13. The process of claim 12 wherein the dried solids comprises at least one of coke and catalyst.

14. The process of claim 12 further comprising:
    mixing the residual solvent with fresh pitch from a thermal hydrocracking process.

15. A process for producing an asphalt binder, the process comprising:
    mixing a pitch from a slurry hydrocracking zone with a solvent in a mixing zone, at least a portion of the pitch being soluble in the solvent;
    separating the solvent and a soluble portion of the pitch from an insoluble portion of the pitch in a separation zone;
    removing the soluble portion of the pitch from the solvent in a solvent recovery zone;
    mixing the solvent removed from the soluble portion of the pitch from the solvent recovery zone in the mixing zone with fresh pitch;
    drying the insoluble portion of the pitch separated from the soluble portion of the pitch and the solvent to form a dried solids;

recovering a residual solvent during the drying, wherein the residual solvent is passed to the solvent recovery zone.

16. The process of claim 15 wherein the solvent is an aromatic solvent selected from the group consisting of: light cycle oil; Hi-Sol 15; heavy reformate; toluene; benzene; furfural; heavy naphtha; and, clarified slurry oil.

17. The process of claim 15 wherein the solvent has a boiling point range of between approximately 180° C. and 200° C.

18. The process of claim 15 wherein the solvent has a boiling point range with a high end that is lower than an initial boiling point of the pitch and a low end that is higher than a maximum operating temperature of the separation zone.

\* \* \* \* \*